UNITED STATES PATENT OFFICE.

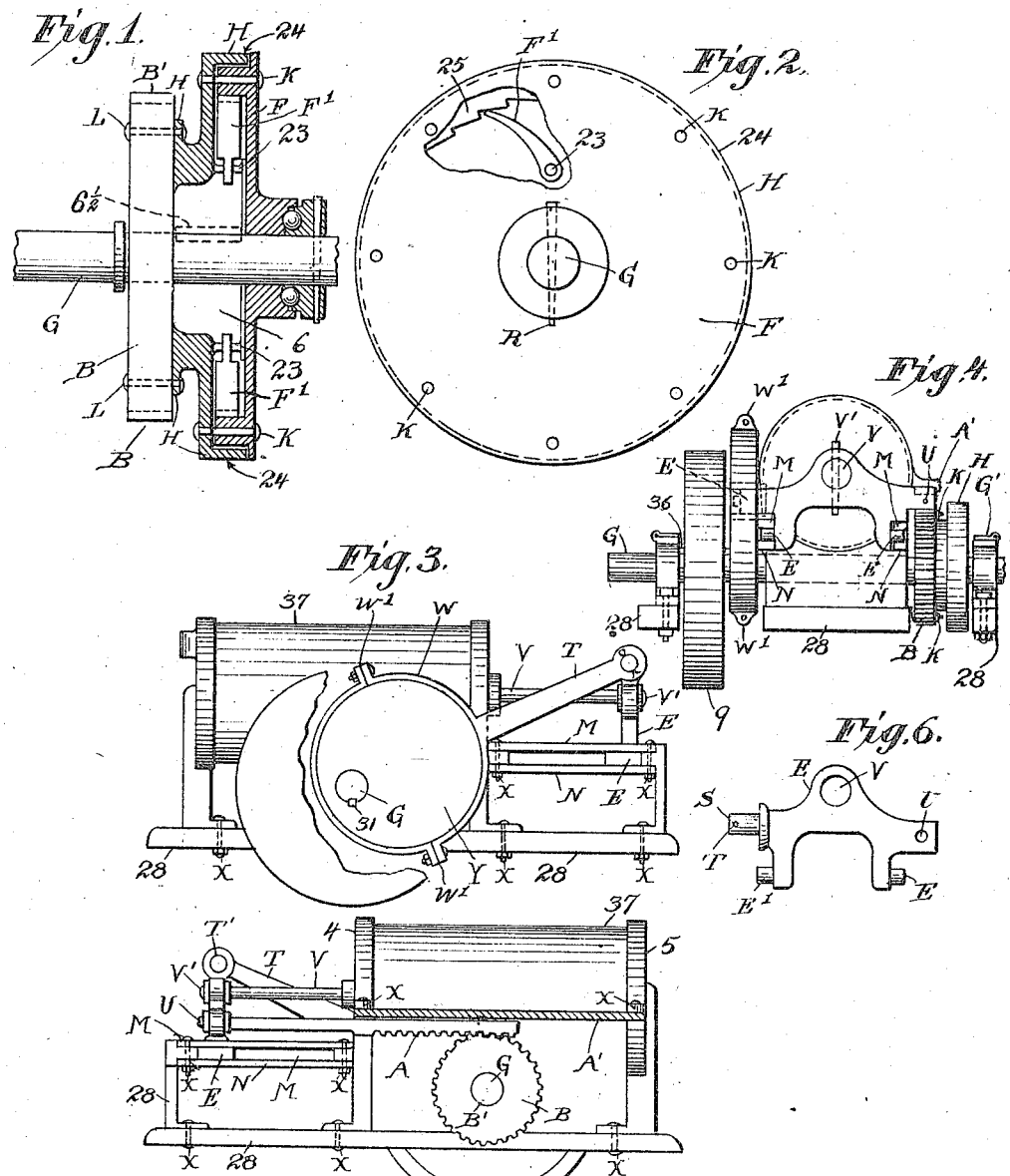

LUTHER C. THOMPSON, OF WASHINGTON, DISTRICT OF COLUMBIA, ASSIGNOR OF SEVEN-SIXTEENTHS TO FERDINAND FRANZ, OF BALTIMORE, MARYLAND.

MECHANICAL MOVEMENT.

1,233,619.  Specification of Letters Patent.  Patented July 17, 1917.

Application filed February 15, 1913. Serial No. 748,747.

*To all whom it may concern:*

Be it known that I, LUTHER C. THOMPSON, a citizen of the United States, and a resident of the city of Washington, in the District of Columbia, have invented a new and Improved Mechanical Movement, of which the following is a full, clear, and exact description, that will enable those skilled in the art to make and use the same, reference being had to the accompanying drawings, that form a part of this specification.

The object of this, my invention is to provide a new and improved mechanical movement.

This my invention relates to a timed mechanical movement, in assembling the mechanical parts, I provide a straight driving shaft and support the same in journal boxes, the eccentric is rigidly keyed to the driving shaft, and an eccentric ring is journaled on the eccentric, an arm forming a part of the eccentric ring is journaled at the end thereof with the reciprocating draw-head and thereby timing the reciprocating movements of the draw-head and the connecting members thereof in union with the revolving movements of the drive-shaft, thus providing a pre-determined timed movement of the reciprocating draw-head.

Sectional drawing Figure 1 is a transversed section, Fig. 2 is a side elevation, Fig. 3 is a side elevation, Fig. 4 is an end elevation, Fig. 5 is a side elevation, Fig. 6 is a face view of the draw-head detached. The parts are assembled and connected as follows. The shaft G is rigidly keyed to the wheel 6 at 6½, the clutch levers F' F' are hinged to the wheel 6 at 23 and 23, the members U and V' are rigidly bolted to the draw-head E, cogs are provided in the member A that are fitted with the corresponding cog of the wheel B, the wheel B is rigidly connected with the clutch case 24 by the rivets L L. The wheel 6 being inclosed in the ratchet case 24, and the wheel B and the ratchet case 24 are loosely journaled upon the shaft G and are subject to the reversible movements of the member A that transmits the momentum to the wheel 6 and shaft G in union with the reciprocating movements of the draw-head E and the members T and V transmitting the power to the shaft G by the clutch connections F' and F', the eccentric Y is rigidly keyed to the shaft G at 31, the eccentric ring W is journaled upon the eccentric Y and held in position by the bolt connections W' and W', the arm T connects the eccentric ring and the end thereof is journaled with the draw-head E at journal S, see Fig. 6. The eccentric Y times the reciprocating movement of the draw-head and the connecting members V and U with the revolving movement of shaft G. Operative power may be applied to the member V and transmit the power to the shaft G or power may be applied to the shaft G and transmit the power to the member V. The draw-head E is supported in position by the bracket 28, and guide bars M and N as secured by the bolts X X, the member A is supported by the guide A', the movement being supported in connection with the base frame 28, the guides E' and E interpose between the guide bars M and N, see Fig. 5.

Having thus described my invention what I claim as new in a mechanical movement and desire to secure by Letters Patent is:

A mechanical movement comprising a reciprocating member, a shaft, means operated by said reciprocating member for rotating said shaft, an eccentric fixedly mounted upon said shaft and also connected with said reciprocating member for limiting the throw of said reciprocating member.

LUTHER C. THOMPSON.

Witnesses:
C. M. SANDERS,
M. L. WOLLET.

Copies of this patent may be obtained for five cents each, by addressing the "Commissioner of Patents, Washington, D. C."